(12) United States Patent
Windmark et al.

(10) Patent No.: US 10,440,288 B2
(45) Date of Patent: Oct. 8, 2019

(54) METHODS AND APPARATUSES FOR CAPTURING IMAGE FRAMES WITH INTERLACED EXPOSURE

(71) Applicant: Microsoft Technology Licensing, LLC, Redmond, WA (US)

(72) Inventors: Johan Windmark, Lund (SE); Gustaf Pettersson, Lund (SE)

(73) Assignee: Microsoft Technology Licensing, LLC, Redmond, WA (US)

( * ) Notice: Subject to any disclaimer, the term of this patent is extended or adjusted under 35 U.S.C. 154(b) by 317 days.

(21) Appl. No.: 14/843,624

(22) Filed: Sep. 2, 2015

(65) Prior Publication Data
US 2017/0064213 A1    Mar. 2, 2017

(51) Int. Cl.
| | |
|---|---|
| H04N 5/235 | (2006.01) |
| G03B 7/00 | (2014.01) |
| H04N 5/265 | (2006.01) |
| H04N 5/232 | (2006.01) |
| G06T 5/00 | (2006.01) |
| H04N 5/355 | (2011.01) |

(52) U.S. Cl.
CPC ............ *H04N 5/265* (2013.01); *G06T 5/007* (2013.01); *H04N 5/23216* (2013.01); *H04N 5/23293* (2013.01); *H04N 5/35545* (2013.01); *G06T 2207/20208* (2013.01); *H04N 5/2356* (2013.01)

(58) Field of Classification Search
CPC .... H04N 5/235; H04N 5/2352; H04N 5/2353; H04N 5/2354; H04N 5/2355; H04N 5/2356; H04N 5/353; H04N 5/3532; H04N 5/3535; H04N 5/35536; H04N 5/35545; H04N 5/35563
See application file for complete search history.

(56) References Cited

U.S. PATENT DOCUMENTS

| | | | |
|---|---|---|---|
| 6,392,710 B1 | 5/2002 | Gonsalves et al. | |
| 6,856,427 B1* | 2/2005 | Gilman | H04N 1/6011 358/1.9 |
| 7,227,572 B2 | 6/2007 | Kondo | |
| 7,233,355 B2 | 6/2007 | Kameyama et al. | |

(Continued)

OTHER PUBLICATIONS

Latzel, et al., "A Robust Motion Detection and Estimation Filter for Video Signals", In Proceedings of International Conference on Image Processing, vol. 1, Oct. 2001, pp. 381-384.

(Continued)

*Primary Examiner* — Kelly L Jerabek

(57) ABSTRACT

An apparatus and a method for capturing image frames using interlaced exposure. The apparatus includes a digital camera and a memory. The digital camera includes an image sensor and the memory includes camera settings. The apparatus further includes a processor and a user interface. The user interface enables a user to manually input or adjust image capture parameter values including at least one first capture parameter value for a first set of pixels from the image sensor, and, at least one second capture parameter value for a second set of pixels from the image sensor. The processor controls the digital camera to expose the first set of pixels using the at least one first capture parameter value and the second set of pixels using the at least one second capture parameter value, where exposures of the first set of pixels and the second set of pixels overlap in time.

20 Claims, 8 Drawing Sheets

(56) References Cited

U.S. PATENT DOCUMENTS

| | | |
|---|---|---|
| 7,636,111 B2 | 12/2009 | Oota |
| 8,743,237 B2 | 6/2014 | Sato |
| 8,823,829 B2* | 9/2014 | Imai ........................ H04N 5/142 348/222.1 |
| 2006/0044399 A1 | 3/2006 | Fredlund et al. |
| 2006/0170780 A1 | 8/2006 | Turley et al. |
| 2007/0223904 A1 | 9/2007 | Bloom et al. |
| 2007/0237238 A1 | 10/2007 | Xia et al. |
| 2008/0084486 A1 | 4/2008 | Enge et al. |
| 2009/0091645 A1 | 4/2009 | Trimeche et al. |
| 2009/0213244 A1 | 8/2009 | Seo et al. |
| 2010/0128159 A1* | 5/2010 | Yamashita ............. H04N 9/045 348/311 |
| 2010/0214306 A1* | 8/2010 | Kim ......................... G09G 5/39 345/560 |
| 2010/0309333 A1* | 12/2010 | Smith ..................... H04N 5/235 348/230.1 |
| 2011/0149129 A1 | 6/2011 | Kim et al. |
| 2012/0314095 A1 | 12/2012 | Fukui |
| 2014/0132824 A1 | 5/2014 | Omata et al. |
| 2014/0223344 A1 | 8/2014 | Tarvainen et al. |
| 2014/0300805 A1* | 10/2014 | Davis ..................... H04N 5/238 348/362 |
| 2014/0362269 A1 | 12/2014 | Omori |
| 2015/0029354 A1* | 1/2015 | Yang .................... H04N 5/2355 348/222.1 |
| 2015/0172528 A1 | 6/2015 | Maeyama |
| 2017/0041527 A1* | 2/2017 | Pettersson ........... G06F 3/04847 |

OTHER PUBLICATIONS

"International Preliminary Report on Patentability Issued in PCT Application No. PCT/US2016/045448", dated Jun. 1, 2017, 11 Pages.

"International Search Report and Written Opinion Issued in PCT Application No. PCT/US2016/045448", dated Oct. 18, 2016, 13 Pages.

"Second Written Opinion Issued in PCT Application No. PCT/US2016/045448", dated Feb. 28, 2017, 7 Pages.

* cited by examiner

560

570

580

600

_METHODS AND APPARATUSES FOR CAPTURING IMAGE FRAMES WITH INTERLACED EXPOSURE_

TECHNICAL FIELD

The present application generally relates to user interfaces in digital cameras.

BACKGROUND

Nowadays, digital cameras are equipped with the ability to expose different image fields to different exposure settings. For example, image fields configured by odd or even scan lines of an image sensor may be exposed to different settings. In an example scenario, such an 'interlaced exposure' mode of image capture may be used for creating high dynamic range (HDR) image frames, or even a HDR video, with a long and a short exposure occurring virtually at the same time. In another example scenario, the interlaced exposure mode of image capture may be used to increase a rate of image frame capture. Typically, digital cameras and/or imaging applications automatically adjust settings for each interlaced exposure with minimal user involvement. Moreover, in many example scenarios, only 'exposure time' setting is varied for different image fields during interlaced image capture. However, a user may wish to manually adjust individual settings, such as white balance, gain and the like, for each image frame captured with interlaced exposure. It is desirable to provide a user with better control over capture of image frames with interlaced exposure. Further, it is advantageous to provide an easy way for the user to adjust individual settings for different exposures manually.

The embodiments described below are not limited to implementations, which solve any or all of the disadvantages of known devices.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

In an embodiment, an apparatus for capturing digital image frames with interlaced exposure is presented. The apparatus includes a digital camera and at least one memory. The digital camera includes an image sensor and the at least one memory includes camera settings. The apparatus further includes a processor communicably coupled with the digital camera and the at least one memory. The processor is configured to control operation of the digital camera together with the camera settings stored in the at least one memory. The apparatus further includes a user interface for at least one of inputting and adjusting the camera settings. The user interface is configured to enable a user to manually input or adjust image capture parameter values including at least one first capture parameter value for a first set of pixels from the image sensor, and, at least one second capture parameter value for a second set of pixels from the image sensor. The processor is configured to store the at least one first capture parameter value and the at least one second capture parameter value in the at least one memory. The processor is further configured to control the digital camera to expose the first set of pixels using the at least one first capture parameter value and the second set of pixels using the at least one second capture parameter value, where exposures of the first set of pixels and the second set of pixels overlap in time.

In another embodiment, an apparatus for capturing digital image frames with interlaced exposure is presented. The apparatus includes a digital camera and at least one memory. The at least one memory includes camera settings. The apparatus further includes a processor communicably coupled with the digital camera and the at least one memory. The processor is configured to control operation of the digital camera together with the camera settings stored in the at least one memory. The apparatus further includes a user interface for at least one of inputting and adjusting the camera settings. The user interface is configured to enable a user to manually input or adjust image capture parameter values including at least one first capture parameter value for a first set of pixels of an interlaced image capture, and, at least one second capture parameter value for a second set of pixels of the interlaced image capture. The processor is configured to store the at least one first capture parameter value and the at least one second capture parameter value in the at least one memory. The processor is further configured to control the digital camera to capture at least one digital image frame using the interlaced image capture by using the at least one first capture parameter value for the first set of pixels and using the at least one second capture parameter value for the second set of pixels.

In an embodiment, a method for capturing digital image frames with interlaced exposure is presented. The method includes providing a user interface for at least one of inputting and adjusting camera settings associated with a digital camera. The user interface enables a user to manually input or adjust image capture parameter values including at least one first capture parameter value for a first set of pixels of an interlaced image capture, and, at least one second capture parameter value for a second set of pixels of the interlaced image capture. The method further includes receiving, by a processor, the at least one first capture parameter value and the at least one second capture parameter value. Further, the method includes storing, by the processor, the at least one first capture parameter value and the at least one second capture parameter value. Thereafter, the method includes causing, by the processor, a capture of at least one digital image frame using interlaced image capture by using the at least one first capture parameter value for the first set of pixels and using the at least one second capture parameter value for the second set of pixels.

In another embodiment, a method for capturing digital image frames with interlaced exposure is presented. The method includes providing a user interface for at least one of inputting and adjusting camera settings associated with a digital camera. The digital camera includes an image sensor. The user interface enables a user to manually input or adjust image capture parameter values including at least one first capture parameter value for a first set of pixels of the image sensor, and, at least one second capture parameter value for a second set of pixels of the image sensor. The method further includes receiving, by a processor, the at least one first capture parameter value and the at least one second capture parameter value. Further, the method includes storing, by the processor, the at least one first capture parameter value and the at least one second capture parameter value. Thereafter, the method includes controlling the digital camera, by the processor, to expose the first set of pixels using the at least one first capture parameter value and the second set of pixels using the at least one second capture parameter value, where exposures of the first set of pixels and the second set of pixels overlap in time.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the following accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. However, the same or equivalent functions and sequences may be accomplished by different examples.

Figure 1:
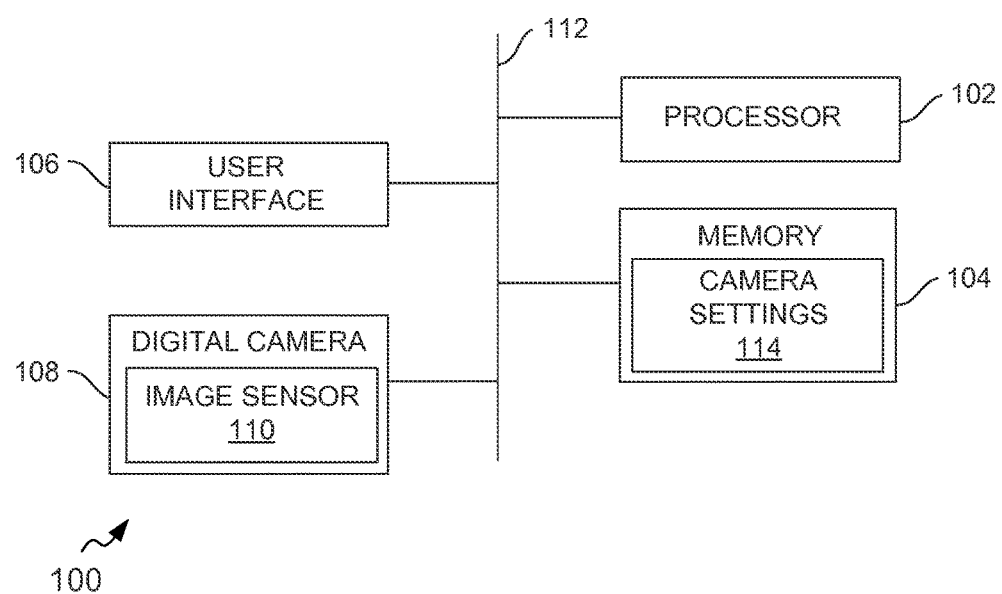
FIG. 1 is a block diagram showing an apparatus, in accordance with an example embodiment.

FIG. 1 is a block diagram showing an apparatus 100, in accordance with an example embodiment. It is understood that the apparatus 100 as illustrated and hereinafter described is merely illustrative of an apparatus that could benefit from embodiments of the disclosure and, therefore, should not be taken to limit the scope of the disclosure. The apparatus 100 may be a mobile phone, a laptop computer, a tablet computer, a media player, a camera, a video recorder, a global positioning system (GPS) apparatus, and/or any other type of electronic system including a programmable camera. It is noted that the apparatus 100 may include fewer or more components than those depicted in FIG. 1. Moreover, the apparatus 100 may be implemented as a centralized apparatus, or, alternatively, the various components of the apparatus 100 may be deployed in a distributed manner while being operatively coupled to each other. In an embodiment, one or more components of the apparatus 100 may be implemented as a set of software layers on top of existing hardware systems. In an exemplary scenario, the apparatus 100 may be any machine capable of executing a set of instructions (sequential and/or otherwise) so as to enable capturing of digital image frames with interlaced exposure.

In at least one example embodiment, the apparatus 100 includes a processor for example, a processor 102, and at least one memory for example, a memory 104. The memory 104 is capable of storing machine executable instructions. Further, the processor 102 is capable of executing the stored machine executable instructions. The processor 102 may be embodied in a number of different ways. In an embodiment, the processor 102 may be embodied as one or more of various processing devices, such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In at least one example embodiment, the processor 102 utilizes computer program code to cause the apparatus 100 to perform one or more actions.

The memory 104 may be embodied as one or more volatile memory devices, one or more non-volatile memory devices, and/or a combination of one or more volatile memory devices and non-volatile memory devices. For example, the memory 104 may be embodied as magnetic storage devices (such as hard disk drives, floppy disks, magnetic tapes, etc.), optical magnetic storage devices (e.g. magneto-optical disks), CD-ROM (compact disc read only memory), CD-R (compact disc recordable), CD-R/W (compact disc rewritable), DVD (Digital Versatile Disc), BD (Blu-ray® Disc), and semiconductor memories (such as mask ROM, PROM (programmable ROM), EPROM (erasable PROM), flash ROM, RAM (random access memory), etc.).

In at least one embodiment, the apparatus 100 includes a user interface 106 for providing an output and/or receiving an input. The user interface 106 is configured to be in communication with the processor 102 and the memory 104. Examples of the user interface 106 include, but are not limited to, an input interface and/or an output interface. Examples of the input interface may include, but are not limited to, a keyboard, a mouse, a joystick, a keypad, a touch screen, soft keys, a microphone, and the like. Examples of the output interface may include, but are not limited to, a display such as light emitting diode display, thin-film transistor (TFT) display, liquid crystal display, active-matrix organic light-emitting diode (AMOLED) display, a microphone, a speaker, ringers, vibrators, and the like. In an example embodiment, the processor 102 may include user interface circuitry configured to control at least some functions of one or more elements of the user interface 106, such as, for example, a speaker, a ringer, a microphone, a display, and/or the like. The processor 102 and/or the user interface circuitry may be configured to control one or more functions of the one or more elements of the user interface 106 through computer program instructions, for example, software and/or firmware, stored in a memory, for example, the memory 104, and/or the like, accessible to the processor 102.

In an example embodiment, the apparatus 100 includes one or more media capturing elements, for example one or more digital cameras, such as a digital camera 108. The digital camera 108 is configured to be in communication with the processor 102 and/or other components of the apparatus 100 to capture digital image frames, videos and/or other graphic media. It is noted that the terms 'digital image frame', 'image frame' and 'digital image' are used interchangeably throughout the description, and should be understood as same, unless otherwise suggested by the context. The digital camera 108 may include hardware and/or software necessary for creating a digital image frame from a captured image. For example, the digital camera 108 may include hardware, such as a lens and/or other optical component(s) such as one or more image sensors like an image sensor 110. Examples of the image sensor 110 may include, but are not limited to, a complementary metal-oxide semiconductor (CMOS) image sensor, a charge-coupled device (CCD) image sensor, a backside illumination sensor (BSI) and the like. Alternatively, the digital camera 108 may include only the hardware for viewing a digital image frame, while a memory device of the apparatus 100 stores instructions for execution by the processor 102 in the form of software for creating a digital image frame from a captured image. In an example embodiment, the digital camera 108 may further include a processing element such as a co-processor that assists the processor 102 in processing image frame data and an encoder and/or decoder for compressing and/or decompressing image frame data. The encoder and/or decoder may encode and/or decode according to a standard format, for example, a Joint Photographic Experts Group (JPEG) standard format.

The various components of the apparatus 100, such as components (102-108) may communicate with each other via a centralized circuit system 112 to capture digital image frames with interlaced exposure. The centralized circuit system 112 may be various devices configured to, among other things, provide or enable communication between the components (102-108) of the apparatus 100. In certain embodiments, the centralized circuit system 112 may be a central printed circuit board (PCB) such as a motherboard, a main board, a system board, or a logic board. The centralized circuit system 112 may also, or alternatively, include other printed circuit assemblies (PCAs) or communication channel media.

In at least one embodiment, the memory 104 is configured to store camera settings 114 corresponding to the digital camera 108. In at least one embodiment, the camera settings 114 include adjustable settings for capture parameters such as exposure compensation, shutter speed, international standards organization (ISO), white balance, delay, zoom, aperture, flash and flash color temperature. For example, the memory 104 may store values of shutter speed setting ranging from '1/1600' of a second to '4' seconds. In another example scenario, the memory 104 may store values of exposure compensation or a brightness component from '−3.0' to '+3.0'. In at least one embodiment, the processor 102 is communicably coupled with the digital camera 108 and the memory 104 and configured to control operation of the digital camera 108 together with the camera settings 114 stored in the memory 104. It is noted that the term 'adjustable settings' as used throughout the description implies settings, which are capable of receiving an input as well as receiving adjustment to a current setting or a capture parameter value depending upon applicable context. In at least one example embodiment, the adjustable settings are configured to enable at least one of the inputting and the adjusting of capture parameter values corresponding to the at least one capture parameter. In at least one embodiment, the user interface 106 is configured to facilitate inputting and/or adjusting of the camera settings 114 so as to enable a user to adjust individual capture parameter settings for different exposures manually. To that effect, the user interface 106 presents an interactive display to the user. The interactive display presented to the user is explained with reference to FIG. 2.

Figure 2:
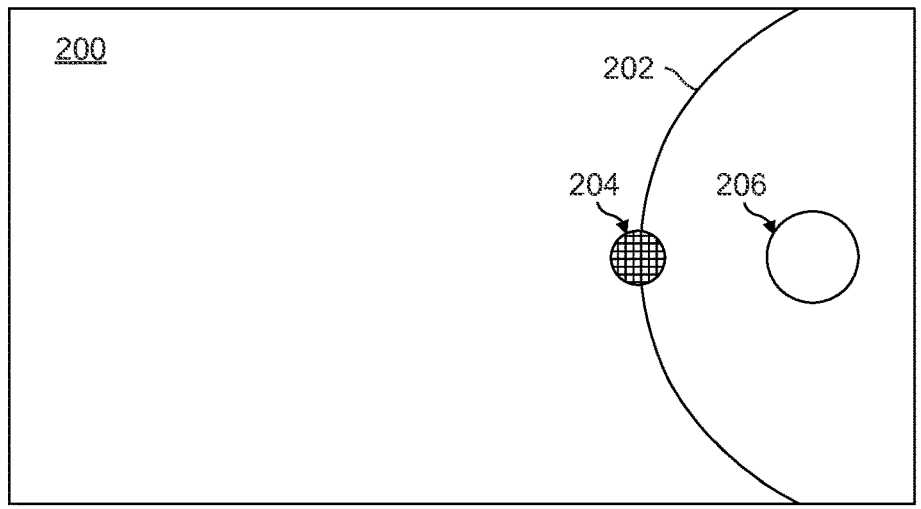
FIG. 2 is a diagram illustrating an example representation of an interactive display presented to a user, in accordance with an example embodiment.

FIG. 2 is a diagram illustrating an example representation of an interactive display 200 presented to a user, in accordance with an example embodiment. In at least one example embodiment, an apparatus, such as the apparatus 100 may present the interactive display 200 to the user upon receiving an input indicative of the user's desire to adjust settings of one or more capture parameters associated with a digital camera, such as the digital camera 108. In an embodiment, the user may access a 'settings operator' while in an image viewfinder mode to indicate desire to adjust settings of one or more capture parameters prior to capturing an image or a video of a scene. The apparatus may be caused to display the interactive display 200 to the user upon receiving such an indication.

In at least one embodiment, the interactive display 200 is configured to display adjustable settings corresponding to at least one capture parameter. In FIG. 2, the interactive display 200 is depicted to exemplarily display a slider interface element 202 configured to enable a user to adjust settings for a capture parameter (for example, a capture parameter such as white balance, focus or the like). It is understood that the interactive display 200 is depicted to display only one slider interface element for illustrative purposes and that the interactive display 200 may display multiple slider interface elements for adjusting settings of multiple capture parameters. Further, it is noted that the slider interface element 202 is depicted to be a curvilinear slider interface element for illustrative purposes. In at least one example embodiment, the curvilinear slider interface element is an elliptical slider interface element having foci proximate to a right boundary of the interactive display 200. However, the position of the foci may vary. For example, the foci may be positioned within a display region associated with the interactive display 200 or beyond the boundary of the display region or beyond the apparatus, etc. Further, in at least one example embodiment, the elliptical slider interface element relates to a partial ellipse. For example, the elliptical slider interface element may relate to a segment of an ellipse. However, the slider interface element 202 may not be limited to the curvilinear slider interface element depicted in FIG. 2. It is understood that various implementations of the slider interface element 202 that are associated with a contour that allows for ergonomically simple utilization may be possible. It is noted that various positions along the contour of the linear shape of the slider interface element 202 correspond to various values of the setting for the capture parameter.

In at least one example embodiment, the slider interface element 202 may be associated with a selection point, such as a selection point 204. In at least one embodiment, a user may cause adjustment of a capture parameter setting by way of causing a change in the position of the selection point 204 relative to the slider interface element 202, such as for example, by dragging the selection point 204 along the contour of the slider interface element 202 using a touch-input or by using a mouse or using any other input means. In such circumstances, the apparatus may determine a capture parameter value to be based, at least in part, on a position of the selection point 204 relative to the corresponding slider interface element 202. For example, the apparatus may correlate position of the selection point 204 along the contour of the slider interface element 202 with the arrangement of values along the contour of the slider interface element 202 to determine the capture parameter value. In at least one example embodiment, a user may provide one or more inputs to manipulate the selection point 204 on the slider interface element 202 displayed by the apparatus. In at least one example embodiment, the indication of the input relates to any communication that the input occurred, such as a message, a function call, modification of a variable, and/or the like.

In many example scenarios, a user may desire to capture image frames using interlaced exposure, i.e. capture image frames by exposing different image fields (or regions within an image frame) to different settings. For example, a user may wish to capture an image frame by exposing some image fields to long exposure and some image fields to short exposure, simultaneously. In at least one example embodiment, a user may be caused to provide a pre-defined user input to provide an indication of the user's desire to provide different settings for different image fields. Some non-exhaustive examples of the pre-defined user input may be a long-press input (i.e. a user clicking/tapping on a displayed element for an elongated period of time, for example, greater than a time threshold of say five seconds) or a secondary-press input or even force touch input. It is understood that examples of pre-defined input are provided herein for illustrative purposes and should not be considered limiting the scope of the disclosure. In an example embodiment, the pre-defined user input may be directed on the selection point 204. In an example embodiment, the selection point 204 may be caused to split into two to generate two selection points upon occurrence of the pre-defined user input event. The selection points generated upon splitting of the selection point 204 may be individually manipulated along the slider interface element 202 to provide separate capture parameter values for different image fields. Upon inputting or adjusting the capture parameter values, the user may click/tap on an operation actuator 206 displayed on the interactive display 200 to provide an indication to the apparatus to initiate interlaced image capture. The apparatus may thereafter cause a digital camera, such as the digital camera 108, to perform interlaced image capture. An example representation of the interactive display 200 presenting two selection points to the user for inputting/adjusting capture parameter settings for interlaced image capture is further explained with reference to FIG. 3.

Figure 3:
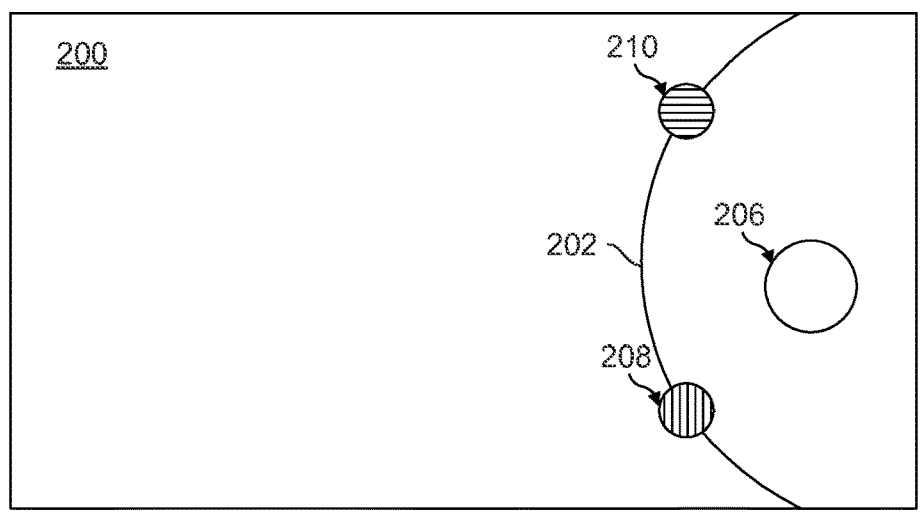
FIG. 3 is a diagram illustrating an example representation of the interactive display of FIG. 2 displaying two selection points for facilitating interlaced image capture, in accordance with another example embodiment.

FIG. 3 is a diagram illustrating an example representation of the interactive display 200 displaying two selection points for facilitating interlaced image capture, in accordance with an example embodiment. As explained with reference to FIG. 2, upon occurrence of the pre-defined user input event, such as a long-press event, the selection point 204 may be caused to split into two to generate two selection points, for example a first selection point 208 and a second selection point 210. Each of the first selection point 208 and the second selection point 210 may be manipulated along the contour of the slider interface element 202 to individually identify a value, i.e. a capture parameter value, associated with the setting for the capture parameter. In at least one example embodiment, a position of the first selection point 208 on the slider interface element 202 may identify a first capture parameter value. Similarly, a position of the second selection point 210 on the slider interface element 202 may identify a second capture parameter value.

It is noted that a mesh pattern associated with the selection point 204 of FIG. 2 is depicted to be split into a pattern of horizontal lines and vertical lines corresponding to the selection points 208 and 210, respectively, in FIG. 3, for illustration purposes only. Indeed various such visual representations of the generated selection points may be pos-sible. In some example embodiments, a parent selection point, such as the selection point 204, may be associated with a first color and a second color (for example, a red color and a blue color) and upon splitting of the selection point 204, each resulting selection point, such as the selection points 208 and 210, may be associated with one constituent color (for example, the red color or the blue color) to enable the user to easily visualize an effect of splitting of the selection point 204. In an embodiment both selection points 208 and 210 may be illustrated with horizontal lines with one or more constituent color. Selection point 208 may be illustrated with blue as a constituent color and horizontal lines of blue and white or blue and black for example. Selection point 210 may be illustrated with red as a constituent colors and horizontal lines of red and white or red and black for example.

In at least one example embodiment, the apparatus may be caused to expose a first set of pixels of an image sensor (such as the image sensor 110 explained with reference to FIG. 1) using the first capture parameter value. Further, the apparatus may be caused to expose a second set of pixels of the image sensor using the second capture parameter value. In at least one example embodiment, the first set of pixels is different than the second set of pixels. Moreover, in some embodiments, the first set of pixels and the second set of pixels together configure the plurality of pixels associated with the image sensor. In at least one example embodiment, the exposure of the first set of pixels and the second set of pixels using the first capture parameter value and the second capture parameter value, respectively, is configured to overlap in time. More specifically, the exposure of the first set of pixels and the second set of pixels, for example to the light reflected from one or more objects in a scene being viewed, may be initiated simultaneously. In some example embodiments, the exposures of the first set of pixels and the second set of pixels may be terminated at a same time instant or at different time instances.

In an embodiment, a processor, such as the processor 102 of the apparatus 100, may be configured to cause a digital camera, such as the digital camera 108, to capture a first partial image frame by exposing the first set of pixels using the first capture parameter value. Further, the processor may cause the digital camera to capture a second partial image frame by exposing the second set of pixels using the second capture parameter value. It is understood that the capture of the first partial image frame and the second partial image frame occurs substantially simultaneously. In an embodiment, the apparatus may be caused to generate a digital image frame by combining the first partial image frame and the second partial image frame. The generation of the digital image frame from the first partial image frame and the second partial image frame is further explained with reference to FIGS. 4A and 4B.

Figure 4A:
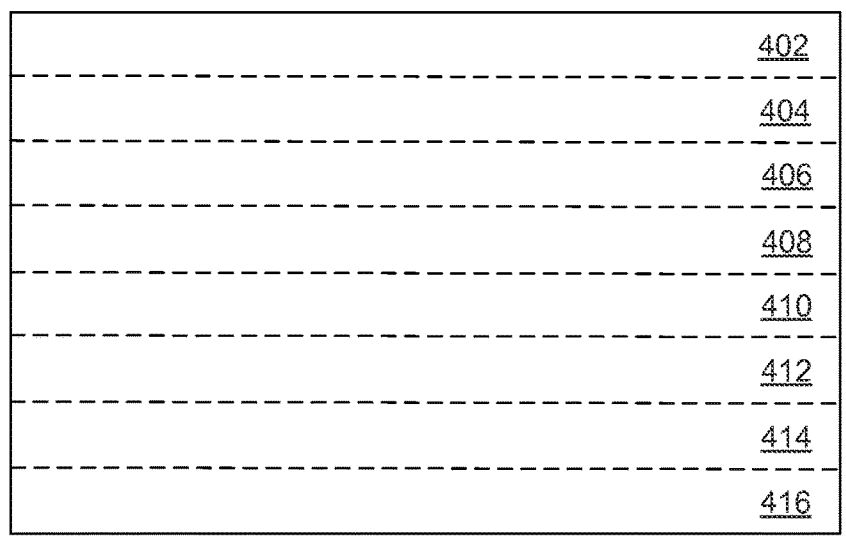
FIG. 4A is a diagram of an example digital image frame generated from combining a first partial image frame and a second partial image frame, in accordance with an embodiment of the invention.

FIG. 4A is a diagram of an example digital image frame 400 generated from combining a first partial image frame and a second partial image frame, in accordance with an embodiment of the invention. The generation of the digital image frame 400 is explained hereinafter with an illustrative example.

In an example scenario, a lens assembly in a digital camera directs incident light reflected from one or more objects being viewed, onto the plurality of pixels of the image sensor in order to facilitate reproduction of the viewed scene in form of a digital image frame, such as the digital image frame 400. Accordingly, it may be construed that each portion in the digital image frame 400 is reproduced based on light incident on a particular pixel region in the image sensor, or more specifically, each portion in the digital image frame 400 is associated with a set of pixels of the image sensor.

For illustration purposes, the digital image frame 400 is depicted to be composed of a plurality of image portions in form of lines 402, 404, 406, 408, 410, 412, 414 and 416, with each line associated with a pre-defined width. In at least one example embodiment, the lines 402-416 correspond to scan lines typically associated with imaging applications. As explained above, each portion from among the plurality of portions, i.e. each line from among the plurality of lines 402-416 corresponds to a set of pixels on the image sensor. In an example scenario, the pixels of the image sensor corresponding to odd lines, such as lines 402, 406, 410 and 414 may be considered to configure the first set of pixels, and, the pixels of the image sensor corresponding to the even lines, such as lines 404, 408, 412 and 416 may be considered to configure the second set of pixels. In at least one example embodiment, the apparatus may be caused to expose the first set of pixels using the first capture parameter value and the second set of pixels using the second capture parameter value, substantially simultaneously, to facilitate interlaced image capture. As explained with reference to FIG. 3, a first partial image frame of a scene is captured by exposing the first set of pixels using the first capture parameter value, and a second partial image frame of the substantially same scene is captured by exposing the second set of pixels using the second capture parameter value.

In at least one example embodiment, the apparatus is caused to generate a digital image frame, such as the digital image frame 400, by combining the so-captured first partial image frame and the second partial image frame. The combination of the partial images may be performed using well-known image interlacing techniques and are not discussed herein. In some embodiments, the apparatus may be configured to present the first partial image frame and the second partial image frame to the user and perform processing of the two partial image frames based on user-input to generate the digital image frame 400.

The digital image frame 400 is depicted to be composed of eight lines with associated width for example purposes and it is understood that the digital image frames, such as the digital image frame 400, may be composed of fewer or more lines. Moreover, the distribution of the various regions in the digital image frame 400 is depicted in form of scan lines for illustration purposes. Another example generation of the digital image frame from partial image frames is explained with reference to FIG. 4B.

Figure 4B:
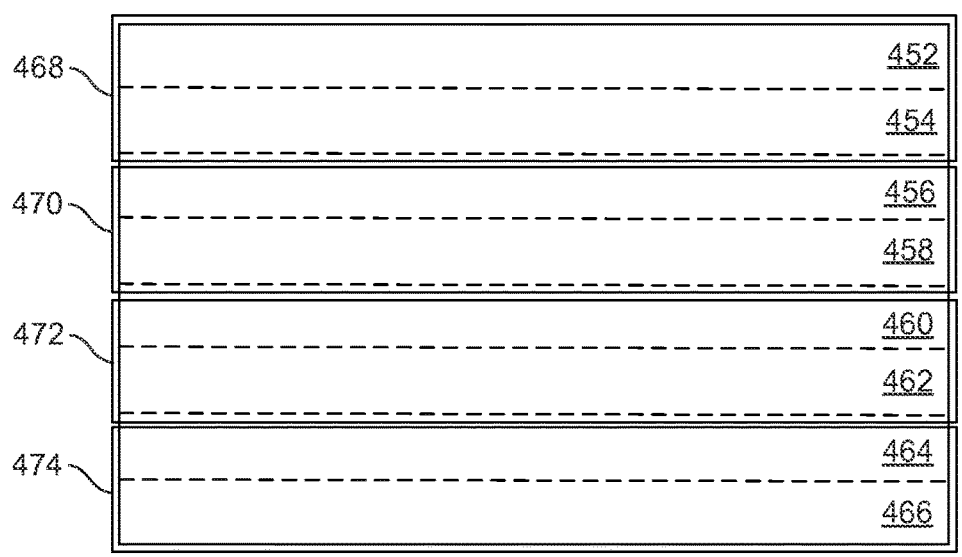
FIG. 4B is a diagram of an example digital image frame generated from combining a first partial image frame and a second partial image frame, in accordance with another embodiment of the invention.

FIG. 4B is a diagram of an example digital image frame 450 generated from combining a first partial image frame and a second partial image frame, in accordance with another embodiment of the invention. For illustration purposes, the digital image frame 450 is depicted to be composed of plurality of lines 452, 454, 456, 458, 460, 462, 464 and 466. As explained with reference to FIG. 4A, each image portion of the digital image frame 450, or more specifically each line from among the plurality of lines 452-466 is associated with a set of pixels of the image sensor. Accordingly, in an embodiment, each image portion composed of a pair of adjacent lines, such as line pairs 452-454, 456-458 and so on and so forth may be associated with a set of pixels. In at least one embodiment, the pixels of the image sensor corresponding to odd pairs of lines, such as line pairs 468 and 472 may configure the first set of pixels, and, the pixels of the image sensor corresponding to the even pairs of lines, such as line pairs 470 and 474 may configure the second set of pixels. In at least one example embodiment, the apparatus may be caused to expose the first set of pixels using the first capture parameter value and the second set of pixels using the second capture parameter value, substantially simultaneously, to facilitate interlaced image capture. Accordingly, the first partial image frame may include odd pairs of scan lines and the second partial image frame may include even pairs of scan lines. In at least one example embodiment, the apparatus may be caused to generate a digital image frame, such as the digital image frame 450, by combining the first partial image frame and the second partial image frame.

It is understood that the exposure of the first set of pixels and the second set of pixels is explained herein with reference to the first capture parameter value and the second capture parameter value, respectively, for illustration purposes only. It is noted that interactive display 200 is configured to display multiple slider interface elements to enable provisioning of multiple first capture parameter values and second capture parameter values corresponding to various camera settings associated with the digital camera. In at least one example embodiment, the interactive display 200 is configured to enable the user to individually adjust the first and the second capture parameter values to at least one of same values and different values. For example, in an illustrative scenario, the interactive display 200 may display three slider interface elements with corresponding selection points for enabling inputting/adjusting of settings corresponding to three capture parameters. The user may provision a long-press input for only one selection point thereby indicating that the first capture parameter value and the second capture parameter value for only that capture parameter are different, whereas the first capture parameter and the second capture parameter values for two other capture parameters are same values.

In at least one embodiment, the apparatus may be caused to store the first capture parameter values and the second capture parameter values in a memory, such as the memory 104, and control the digital camera to expose the first set of pixels and the second set of pixels using the first capture parameter values and the second capture parameter values to facilitate interlaced image capture.

It is noted that the capturing of digital image frames using interlaced exposure is explained herein with respect to the first set of pixels and the second set of pixels with corresponding capture parameter value settings for illustration purposes. In some example embodiments, the interactive display 200 may be configured to enable the user to input or set capture parameter values for three or more different exposures manually. For example, three or more sets of pixels from among the plurality of pixels of the image sensor may be exposed using different exposure settings and raw or partial image frames generated upon respective exposures may be combined by the apparatus to generate the digital image frame.

In at least one example embodiment, the processor of the apparatus may cause the digital camera to capture a sequence of digital images frames with interlaced exposure to facilitate generation of a video. Further, each digital image frame in the video may be generated by combining corresponding first and second partial image frames as explained with reference to FIGS. 4A and 4B. A capturing of digital image frames with interlaced exposure is explained in further detail with reference to an illustrative example using FIGS. 5A to 5F.

Figure 5A:
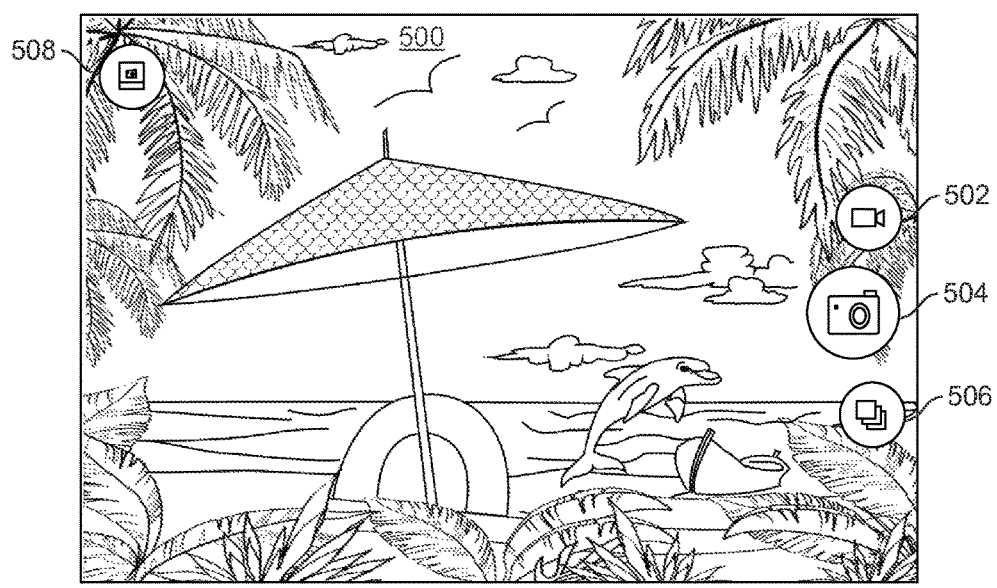
FIGS. 5A-5F are diagrams illustrating example representation of a process flow for capturing a digital image frame corresponding to a scene with interlaced exposure, in accordance with an embodiment.

FIGS. 5A-5F are diagrams illustrating example representation of a process flow for capturing a digital image frame corresponding to a scene with interlaced exposure, in accordance with an embodiment. In many example scenarios, a user may invoke a viewfinder mode of a digital camera to capture a scene. FIG. 5A is a diagram depicting a display region 500 associated with a user interface (such as the user interface 106 explained with reference to FIG. 1) displaying a nature scene upon invoking the viewfinder mode associated with a digital camera, such as the digital camera 108 of FIG. 1.

The display region 500 is depicted to exemplarily display an operation mode selector 502, an operation actuator 504, an image gallery actuator 506 and a settings operator 508. In at least one embodiment, the operation mode selector 502 is configured to facilitate user-selection of an operation mode from among an image capture mode, a video capture mode and a high dynamic range (HDR) image capture mode. The operation actuator 504 is configured to display the selected operation mode and further enable the user to initiate actuation of an operation related to the selected operation mode. In FIG. 5A, an image capture mode is depicted to be selected by the user, and accordingly, the operation actuator 504 is configured to display 'a camera icon' representing the image capture mode. The user may provide an input related to the operation actuator 504 (for example, by providing touch-input or by selecting the displayed operation actuator 504 using any other input means) to initiate actuation of image capture by the digital camera.

Figure 5B:
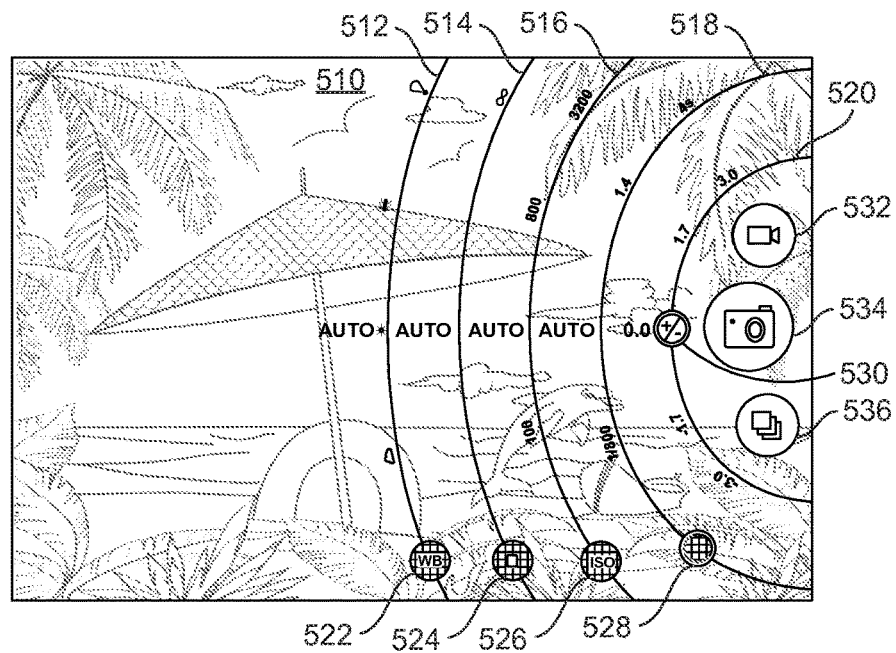

In at least one example embodiment, the image gallery actuator 506 is configured to display an icon-based (or a listing-based) preview of digital image frames captured using the digital camera. In at least one example embodiment, the settings operator 508 is configured to display a list of options for accessing 'settings options' corresponding to the camera settings associated with the digital camera. In at least one example embodiment, an option from among a plurality of options displayed upon user-selection of the settings operator 508 may result in invoking an interactive display 510 as depicted in FIG. 5B. It is understood that a manner of invoking of the interactive display 510 may not be limited to the illustrative example explained herein and indeed the interactive display 510 may be invoked in a number of different ways. For instance, in an illustrative example, the user may swipe across the display region 500 to invoke the interactive display 510 from the viewfinder mode.

Referring now to FIG. 5B, a diagram illustrating an example representation of the interactive display 510 is depicted, in accordance with an example embodiment. The interactive display 510 displays slider interface elements 512, 514, 516, 518 and 520 corresponding to capture parameters related to white balance, focus, ISO, shutter speed and exposure compensation, respectively. Each slider interface element displayed on the interactive display 510 is associated with a selection point configured to facilitate user selection of at least one capture parameter value from among a plurality of capture parameter values associated with a plurality of positions on the slider interface elements. For example, the slider interface elements 512, 514, 516, 518 and 520 are associated with selection points 522, 524, 526, 528 and 530, respectively.

The slider interface element 512 is depicted to be associated with a plurality of capture parameter values configured to facilitate removing unrealistic color impression on objects, so that objects which appear white in person are rendered white in a captured digital image frame. Some exemplary capture parameter values displayed on the slider interface element 512 relate to a current lighting condition, such as for example lighting conditions such as 'cloudy',
'daylight', 'incandescent' and 'fluorescent'. The slider interface element 514 corresponding to the focus capture parameter is depicted to be associated with a plurality of capture parameter values for determining optimum range from the digital camera till which objects present therein are reproduced clearly. An exemplary capture parameter value displayed on the slider interface element 514 is 'infinity' (implying a user may select a capture parameter value for the focus parameter from a minimum preset value, such as 15 cm range, to infinity).

The slider interface element 516 corresponding to the ISO capture parameter is depicted to be associated with a plurality of capture parameter values corresponding to various light related sensitivity values associated with an image sensor of the digital camera. Some exemplary capture parameter values displayed on the slider interface element 516 are '100', '800' and '3200'. The slider interface element 518 corresponding to the shutter speed capture parameter (i.e. 'exposure time' related capture parameter) is depicted to be associated with a plurality of capture parameter values corresponding to various values for a length of time a shutter of the digital camera is open when capturing a digital image frame. Some exemplary capture parameter values displayed on the slider interface element 518 are '1/800', '1.4' and '4's.

The slider interface element 520 associated with the exposure compensation capture parameter (i.e. brightness related capture parameter) is depicted to be associated with a plurality of capture parameter values corresponding to various values for adjusting/compensating brightness in an captured digital image frame. Some exemplary capture parameter values displayed on the slider interface element 520 are '−3.0', '−1.7', '0.0', '1.7' and '3.0'. In FIG. 5B, an auto setting value is depicted to be selected for the 'white balance', 'focus', 'ISO' and 'shutter speed' capture parameters and '0.0' capture parameter value is selected for an exposure compensation capture parameter. The interactive display 510 is further configured to depict an operation mode selector 532, an operation actuator 534 and an image gallery actuator 536. The operation mode selector 532, the operation actuator 534 and the image gallery actuator 536 are configured to perform functions as explained with reference to the operation mode selector 502, the operation actuator 504 and the image gallery actuator 506 explained with reference to FIG. 5A and are not explained herein.

Figure 5C:
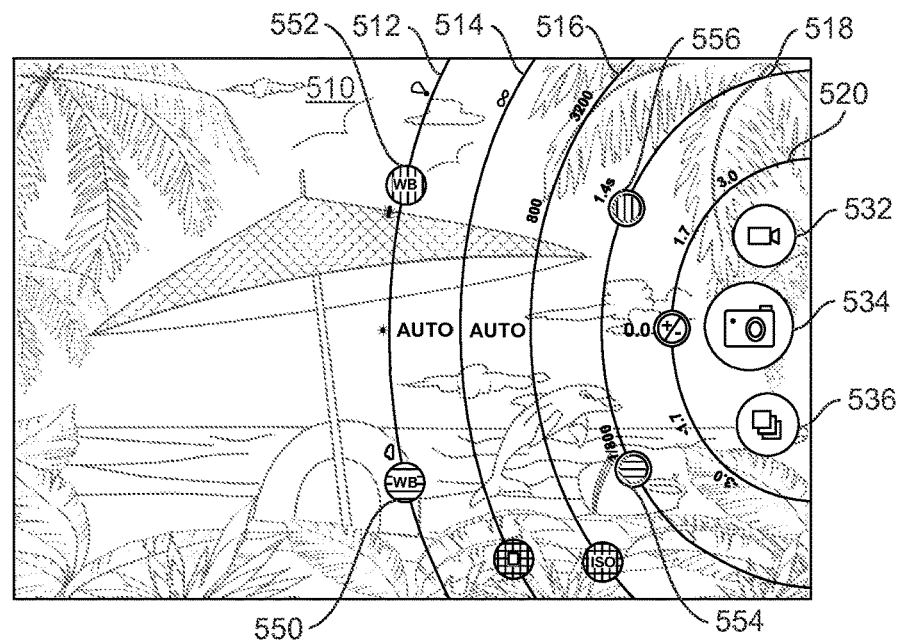

FIG. 5C depicts a snapshot view of the interactive display 510 subsequent to user input for adjusting settings, via respective selection points, for capture parameters white balance and shutter speed. As explained with reference to FIGS. 2 and 3, a user may wish to capture one or more digital image frames with interlaced exposure and accordingly, may provide a pre-defined user input, such as a long-press input, on one or more selection points to split each of the one or more selection points into two to generate two selection points. In FIG. 5C, the interactive display 510 depicts two selections points for each of white balance and shutter speed capture parameters. More specifically, the selection point 522 (of FIG. 5B) is depicted to be split into two to generate selection points 550 and 552 and the selection point 528 (of FIG. 5B) is depicted to be split into two to generate selection points 554 and 556. The selection point 550 is dragged along the contour of the slider interface element 512 to reflect a 'cloudy' setting, whereas the selection point 552 is positioned on the slider interface element 512 to reflect a 'fluorescent' setting. Similarly, the selection point 554 is dragged along the contour of the slider interface element 518 to reflect '1/800' setting for shutter speed capture parameter, whereas the selection point 556 is positioned on the slider interface element 518 to reflect '1.4 s' setting for the shutter speed capture parameter. An auto setting value is depicted to be selected for the 'focus' and 'ISO' capture parameters and '0.0' capture parameter value is selected for an exposure compensation capture parameter. It is noted that the chosen settings by the user for the various capture parameters on the interactive display 510 configure the first capture parameter values and the second capture parameter values for interlaced image capture. For example, the 'cloudy' setting for white balance capture parameter, the auto setting for focus and ISO capture parameters, the 1/800 setting for shutter speed and '0.0' value for exposure compensation configure the first capture parameter values. Similarly, the 'fluorescent' setting for white balance capture parameter, the auto setting for focus and ISO capture parameters, the 1.4 s setting for shutter speed and '0.0' value for exposure compensation configure the second capture parameter values. In an embodiment, the apparatus 100 may be caused to store the first and second capture parameter values in memory, such as the memory 104 explained with reference to FIG. 1. The user may thereafter select an operation actuator 534 to indicate completion of input for interlaced image capture and further actuate capture of the image frame based on individual settings for interlaced exposure.

Figure 5D:
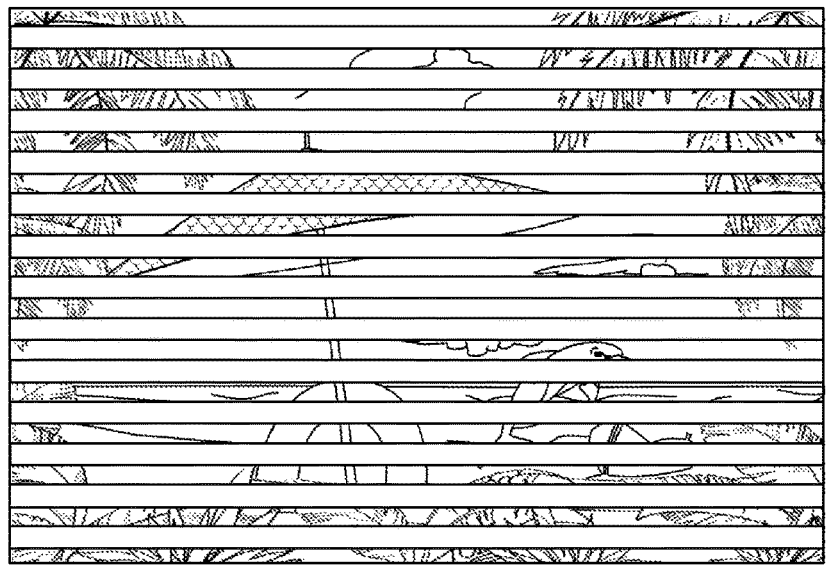
Figure 5E:
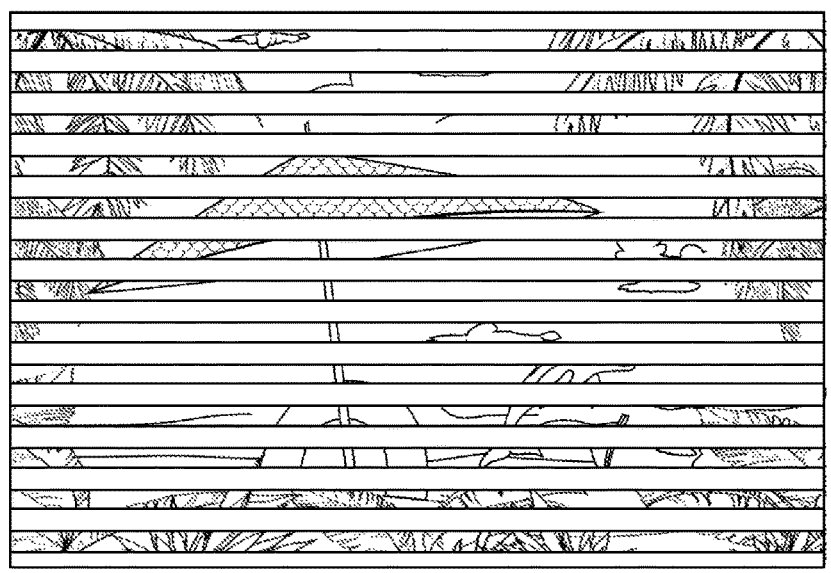

The apparatus may be caused to expose the first set of pixels of the image sensor using the first capture parameter values and expose the second set of pixels of the image sensor using the second capture parameter values with the two exposures overlapping in time. As explained with reference to FIGS. 4A and 4B, the first set of pixels and the second set of pixels may be associated with specific image portions within the image, such as for example odd/even pairs of lines or odd/even lines, resulting in capturing of partial image frames such as the partial image frames depicted in FIGS. 5D and 5E. More specifically, FIG. 5D depicts a first partial image frame 560 captured by exposing the first set of pixels using the first capture parameter values and FIG. 5E depicts a second partial image frame 570 captured by exposing the second set of pixels using the second capture parameter values.

Figure 5F:
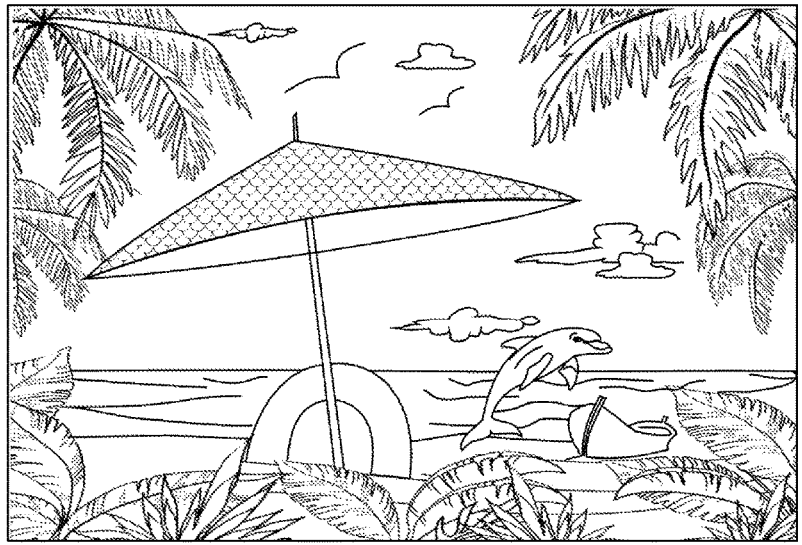

In at least one example embodiment, the apparatus may be caused to combine the first partial image frame 560 and the second partial image frame 570 to generate the digital image frame. An example digital image frame 580 generated by combining the first partial image frame 560 and the second partial image frame 580 is depicted in FIG. 5F.

It is noted that though interactive displays, such as the interactive display 200, are depicted in a landscape orientation from FIGS. 2 to 5F, it is understood that rotating the apparatus in a counter-clockwise direction to reflect a portrait orientation has minimally discernable effect on one or more non-image components (for example, slider interface elements, selection points, operation actuators etc.) displayed on the interactive displays. Moreover, one or more slider interface elements may be moved or dragged to another side of a display region, for example from a right side of the display region to a left side of the display region if one or more image objects being viewed are obstructed by the one or more slider interface elements. Furthermore, if a number of camera settings to be displayed on a display region are identified to cover a sizeable portion of the display region, then appropriate scrolling/swiping techniques may be introduced to present adjustable settings corresponding to the various capture parameters in a gradual manner.

Figure 6:
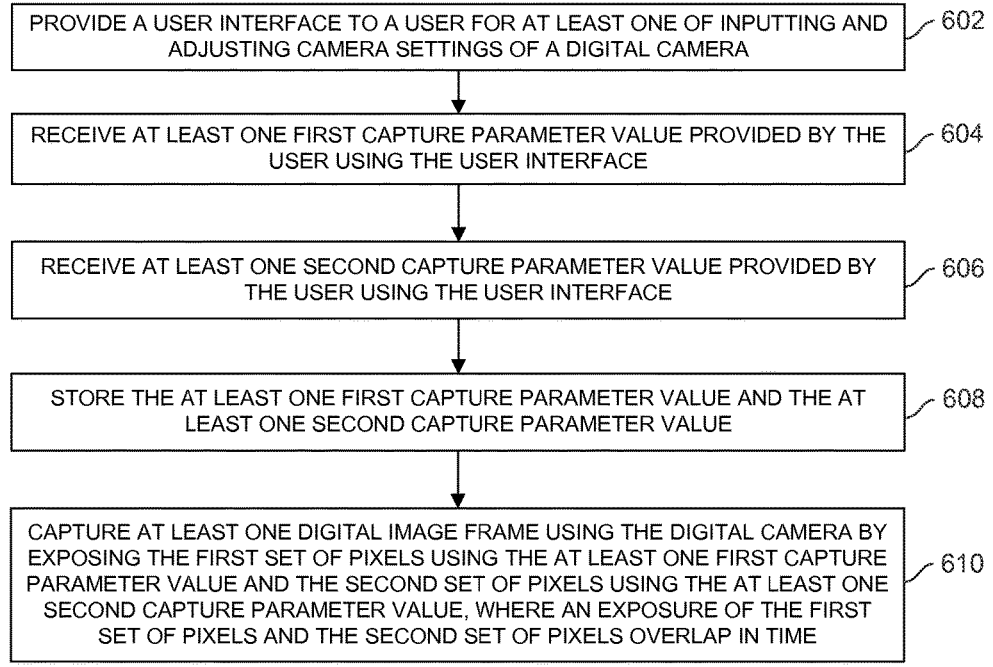
FIG. 6 illustrates an example flow diagram of a method for capturing digital image frames with interlaced exposure, in accordance with an example embodiment.

Some example embodiments of methods of capturing digital image frames with interlaced exposure are described herein with references to FIG. 6. Any of the disclosed methods can be implemented using software comprising computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer or image processor embedded in a device, such as a laptop computer, entertainment console, net book, web book, tablet computing device, smart phone, or other mobile computing device). Such software can be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems can also be stored on one or more computer-readable media (e.g., non-transitory computer-readable media) and are considered to be within the scope of the disclosed technology. Furthermore, any of the software-based embodiments can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

FIG. 6 illustrates an example flow diagram of a method 600 for capturing digital image frames with interlaced exposure in accordance with an example embodiment. Operations of the method 600 may be performed by, among other examples, by the apparatus 100 of FIG. 1.

At 602, the method 600 includes providing a user interface (e.g. the user interface 106 of FIG. 1) to a user for at least one of inputting and adjusting camera settings of a digital camera. An interactive display, such as the interactive display 200 explained with reference to FIGS. 2 and 3 or the interactive display 510 explained with reference to FIGS. 5B, may be provided to the user for inputting and/or adjusting camera settings.

At 604, the method 600 includes receiving at least one first capture parameter value provided by the user using the user interface. The at least one first capture parameter value provided for a first set of pixels of an interlaced image capture.

At 606, the method 600 includes receiving at least one second capture parameter value provided by the user using the user interface. The at least one second capture parameter value provided for a second set of pixels of the interlaced image capture.

At 608, the method 600 includes storing the at least one first capture parameter value and the at least one second capture parameter value. The at least one first capture parameter value and the at least one second capture parameter value may be stored in a memory, such as the memory 104 explained with reference to FIG. 1.

At 610, the method 600 includes capturing at least one digital image frame by exposing the first set of pixels using the at least one first capture parameter value and the second set of pixels using the at least one second capture parameter value, where an exposure of the first set of pixels and the second set of pixels overlap in time. The capturing of the at least one digital image frame may be performed as explained with reference to FIGS. 2 to 5F and are not explained again herein.

Figure 7:
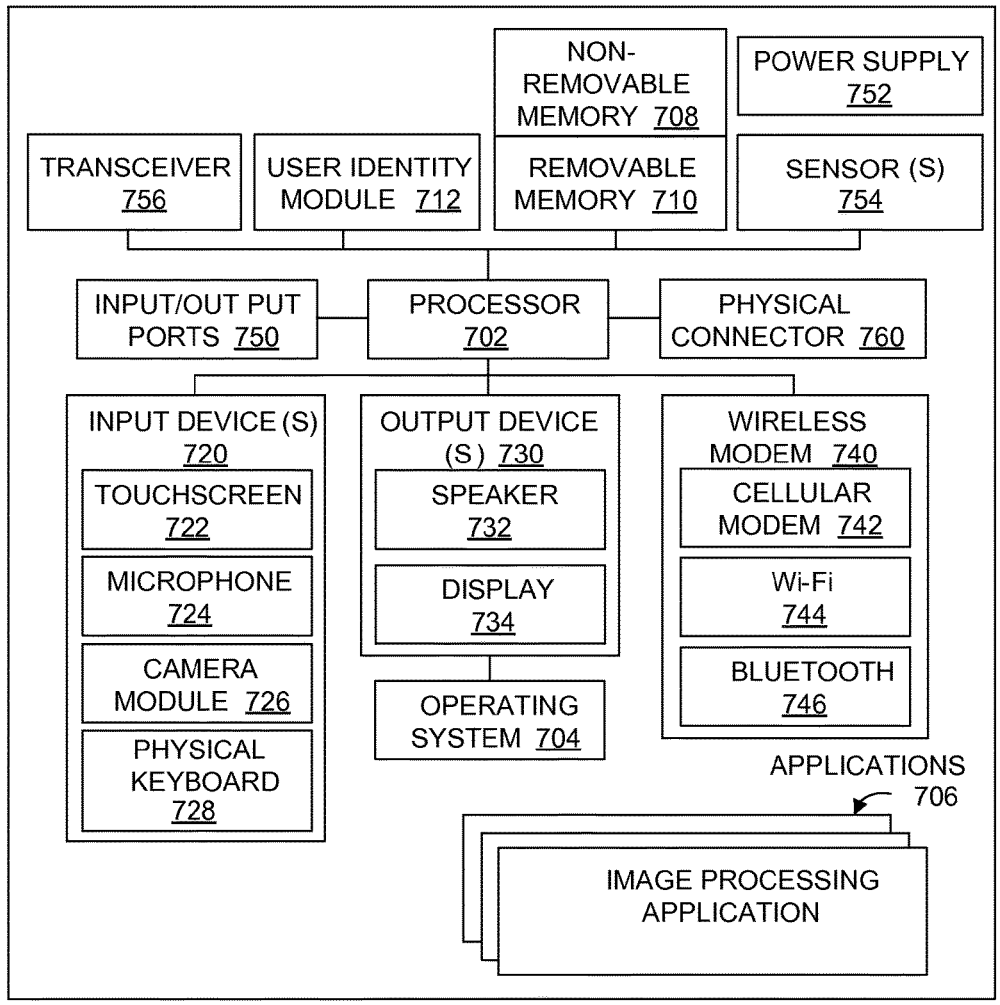
FIG. 7 illustrates an example of a mobile device capable of implementing example embodiments described herein.

Referring now to FIG. 7, a schematic block diagram of a mobile device 700 is shown that is capable of implementing embodiments of techniques for digital image frames with interlaced exposure described herein. It should be understood that the mobile device 700 as illustrated and hereinafter described is merely illustrative of one type of device and should not be taken to limit the scope of the embodiments. As such, it should be appreciated that at least some of the components described below in connection with the mobile device 700 may be optional and thus in an example embodiment may include more, less or different components than those described in connection with the example embodiment of FIG. 7. As such, among other examples, the mobile device 700 could be any of a mobile electronic devices, for example, personal digital assistants (PDAs), mobile televisions, gaming devices, cellular phones, tablet computers, laptops, mobile computers, cameras, mobile digital assistants, or any combination of the aforementioned, and other types of communication or multimedia devices.

The illustrated mobile device 700 includes a controller or a processor 702 (e.g., a signal processor, microprocessor, ASIC, or other control and processing logic circuitry) for performing such tasks as signal coding, data processing, image processing, input/output processing, power control, and/or other functions. An operating system 704 controls the allocation and usage of the components of the mobile device 700 and support for one or more applications programs (see, applications 706), configured to support capturing of digital image frames (for example, with interlaced exposure) that implements one or more of the innovative features described herein. In addition to image capture application; the application programs can include common mobile computing applications (e.g., telephony applications, email applications, calendars, contact managers, web browsers, messaging applications) or any other computing application.

The illustrated mobile device 700 includes one or more memory components, for example, a non-removable memory 708 and/or removable memory 710. The non-removable memory 708 can include RAM, ROM, flash memory, a hard disk, or other well-known memory storage technologies. The removable memory 710 can include flash memory, smart cards, or a Subscriber Identity Module (SIM). The one or more memory components can be used for storing data and/or code for running the operating system 704 and the applications 706. Example of data can include web pages, text, images, sound files, image data, video data, or other data sets to be sent to and/or received from one or more network servers or other devices via one or more wired or wireless networks. The mobile device 700 may further include a user identity module (UIM) 712. The UIM 712 may be a memory device having a processor built in. The UIM 712 may include, for example, a SIM, a universal integrated circuit card (UICC), a universal subscriber identity module (USIM), a removable user identity module (R-UIM), or any other smart card. The UIM 712 typically stores information elements related to a mobile subscriber. The UIM 712 in form of the SIM card is well known in Global System for Mobile Communications (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The mobile device 700 can support one or more input devices 720 and one or more output devices 730. Examples of the input devices 720 may include, but are not limited to, a touch screen 722 (e.g., capable of capturing finger tap inputs, finger gesture inputs, multi-finger tap inputs, multi-finger gesture inputs, or keystroke inputs from a virtual keyboard or keypad), a microphone 724 (e.g., capable of capturing voice input), a camera module 726 (e.g., capable of capturing still picture images and/or video images) and a physical keyboard 728. Examples of the output devices 730 may include, but are not limited to a speaker 732 and a display 734. Other possible output devices (not shown) can include piezoelectric or other haptic output devices. Some devices can serve more than one input/output function. For example, the touch screen 722 and the display 734 can be combined into a single input/output device.

In an embodiment, the camera module 726 may include a digital camera capable of forming a digital image file from a captured image. In some implementations, the camera module 726 may include two or more cameras, for example, a front camera and a rear camera positioned on two sides of the mobile device 700 (e.g., in a mobile device). As such, the camera module 726 includes all hardware, such as a lens or other optical component(s), and software for creating a digital image file from a captured image. Alternatively, the camera module 726 may include the hardware needed to view an image, while a memory device of the mobile device 700 stores instructions for execution by the processor 702 in the form of software to create a digital image file from a captured image. In an example embodiment, the camera module 726 may further include a processing element such as a co-processor, which assists the processor 702 in processing image data and an encoder and/or decoder for compressing and/or decompressing image data. In an embodiment, the camera module 726 may provide live image data (viewfinder image data) to the display 734.

A wireless modem 740 can be coupled to one or more antennas (not shown) and can support two-way communications between the processor 702 and external devices, as is well understood in the art. The wireless modem 740 is shown generically and can include, for example, a cellular modem 742 for communicating at long range with the mobile communication network, a Wi-Fi-compatible modem 744 for communicating at short range with an external Bluetooth-equipped device or a local wireless data network or router, and/or a Bluetooth-compatible modem 746. The wireless modem 740 is typically configured for communication with one or more cellular networks, such as a GSM network for data and voice communications within a single cellular network, between cellular networks, or between the mobile device and a public switched telephone network (PSTN).

The mobile device 700 can further include one or more input/output ports 750, a power supply 752, one or more sensors 754 for example, an accelerometer, a gyroscope, a compass, or an infrared proximity sensor for detecting the orientation or motion of the mobile device 700, a transceiver 756 (for wirelessly transmitting analog or digital signals) and/or a physical connector 760, which can be a USB port, IEEE 1394 (FireWire) port, and/or RS-232 port. The illustrated components are not required or all-inclusive, as any of the components shown can be deleted and other components can be added.

With the image processing applications and/or other software or hardware components, the mobile device 700 can implement the technologies described herein. For example, the processor 702 can facilitate capture of images or image frames of a scene through the camera module 726 and perform post-processing of the captured image frames.

Although the mobile device 700 is illustrated in FIG. 7 in form of a smartphone, but more particularly, the techniques and solutions described herein can be implemented with connected devices having other screen capabilities and device form factors, such as a tablet computer, a virtual reality device connected to a mobile or desktop computer, an image sensor attached to a gaming console or television, and the like.

An embodiment of an apparatus comprises
  a digital camera comprising an image sensor;
  at least one memory comprising camera settings;
  a processor communicably coupled with the digital camera and the at least one memory and configured to control operation of the digital camera together with the camera settings stored in the at least one memory; and
  a user interface for at least one of inputting and adjusting the camera settings, wherein the user interface enables a user to at least one of manually inputting and adjusting image capture parameter values comprising:
    at least one first capture parameter value for a first set of pixels from the image sensor; and
    at least one second capture parameter value for a second set of pixels from the image sensor,
  wherein the processor is configured to store the at least one first capture parameter value and the at least one second capture parameter value in the at least one memory, and to control the digital camera to expose the first set of pixels using the at least one first capture parameter value and the second set of pixels using the at least one second capture parameter value, and
  wherein exposures of the first set of pixels and the second set of pixels overlap in time.

In one embodiment of the apparatus the processor is configured to cause the digital camera to capture:
  a first partial image frame by exposing the first set of pixels of the image sensor using the at least one first capture parameter value; and
  a second partial image frame by exposing the second set of pixels of the image sensor using the at least one second capture parameter value.

In one embodiment of the apparatus, alternatively or in addition, the processor is configured to combine the first partial image frame and the second partial image frame to generate a digital image frame.

In one embodiment of the apparatus, alternatively or in addition, the first partial image frame comprises odd pairs of lines of the digital image frame and the second partial image frame comprises even pairs of lines of the digital image frame.

In one embodiment of the apparatus, alternatively or in addition, the first partial image frame comprises odd lines of the digital image frame and the second partial image frame comprises even lines of the digital image frame.

In one embodiment of the apparatus, alternatively or in addition, the processor is configured to cause the digital camera to capture a plurality of digital image frames in a sequence to facilitate generation of a video from the plurality of digital image frames, each digital image frame from among the plurality of digital image frames generated by combining corresponding first and second partial image frames, the first and the second partial image frames captured by exposing the first set of pixels and the second set of pixels using the at least one first capture parameter value and the second capture parameter value, respectively.

In one embodiment of the apparatus, alternatively or in addition, the camera settings comprise adjustable settings for at least one capture parameter from among exposure compensation, shutter speed, white balance, ISO, delay, zoom, aperture, flash and flash color temperature, the adjustable settings configured to enable at least one of the inputting and the adjusting of capture parameter values corresponding to the at least one capture parameter.

In one embodiment of the apparatus, alternatively or in addition, the processor is configured to cause the user interface to present an interactive display to the user, the interactive display displaying the adjustable settings corresponding to the at least one capture parameter to enable the user to provide input related to the at least one first capture parameter value and the at least one second capture parameter value.

In one embodiment of the apparatus, alternatively or in addition, the interactive display is configured to enable the user to individually adjust the first and the second capture parameter values to at least one of same values and different values.

In one embodiment of the apparatus, alternatively or in addition, the first and the second capture parameter values are displayed to the user on the interactive display at a same time.

Another embodiment of an apparatus comprises
  a digital camera;
  at least one memory comprising camera settings;
  a processor communicably coupled with the digital camera and the at least one memory and configured to control operation of the digital camera together with the camera settings stored in the at least one memory; and
  a user interface for at least one of inputting and adjusting the camera settings, wherein the user interface enables a user to at least one of manually inputting and adjusting image capture parameter values comprising:
    at least one first capture parameter value for a first set of pixels of an interlaced image capture; and
    at least one second capture parameter value for a second set of pixels of the interlaced image capture,
  wherein the processor is configured to store the at least one first capture parameter value and the at least one second capture parameter value in the at least one memory, and to control the digital camera to capture at least one digital image frame using the interlaced image capture by using the at least one first capture parameter value for the first set of pixels and using the at least one second capture parameter value for the second set of pixels.

In one embodiment of the apparatus each digital image frame from among the at least one digital image frame is generated by combining:
  a first partial image frame captured by using the at least one first capture parameter value for the first set of pixels during the interlaced image capture; and
  a second partial image frame captured by using the at least one second capture parameter value for the second set of pixels during the interlaced image capture.

In one embodiment of the apparatus, alternatively or in addition, the first partial image frame comprises odd pairs of lines of the digital image frame and the second partial image frame comprises even pairs of lines of the digital image frame.

In one embodiment of the apparatus, alternatively or in addition, the first partial image frame comprises odd lines of the digital image frame and the second partial image frame comprises even lines of the digital image frame.

In one embodiment of the apparatus, alternatively or in addition, the processor is configured to cause the user interface to present an interactive display to the user, the interactive display displaying adjustable settings corresponding to at least one capture parameter to enable the user to provide input related to the at least one first capture parameter value and the at least one second capture parameter value.

In one embodiment of the apparatus, alternatively or in addition, the interactive display is configured to enable the user to individually adjust the first and the second capture parameter values to at least one of same values and different values.

In one embodiment of the apparatus, alternatively or in addition, the first and the second capture parameter values are displayed to the user on the interactive display at a same time.

An embodiment of a method comprises
providing a user interface for at least one of inputting and adjusting camera settings associated with a digital camera, wherein the user interface enables a user to manually input or adjust image capture parameter values comprising:
at least one first capture parameter value for a first set of pixels of an interlaced image capture; and
at least one second capture parameter value for a second set of pixels of the interlaced image capture;
receiving, by a processor, the at least one first capture parameter value and the at least one second capture parameter value;
storing, by the processor, the at least one first capture parameter value and the at least one second capture parameter value; and
causing, by the processor, a capture of at least one digital image frame using interlaced image capture by using the at least one first capture parameter value for the first set of pixels and using the at least one second capture parameter value for the second set of pixels.

In one embodiment the method further comprises causing the user interface, by the processor, to present an interactive display to the user, the interactive display displaying adjustable settings corresponding to at least one capture parameter to enable the user to provide input related to the at least one first capture parameter value and the at least one second capture parameter value, wherein the interactive display is configured to enable the user to individually adjust the first and the second capture parameter values to at least one of same values and different values.

In one embodiment of the method, alternatively or in addition, the first and the second capture parameter values are displayed to the user on the interactive display at a same time.

Another embodiment of a method comprises
providing a user interface for at least one of inputting and adjusting camera settings associated with a digital camera, the digital camera includes an image sensor, wherein the user interface enables a user to manually input or adjust image capture parameter values comprising:
at least one first capture parameter value for a first set of pixels from the image sensor; and
at least one second capture parameter value for a second set of pixels from the image sensor;
receiving, by a processor, the at least one first capture parameter value and the at least one second capture parameter value;
storing, by the processor, the at least one first capture parameter value and the at least one second capture parameter value; and
controlling the digital camera, by the processor, to expose the first set of pixels using the at least one first capture parameter value and the second set of pixels using the at least one second capture parameter value, where exposures of the first set of pixels and the second set of pixels overlap in time.

Various example embodiments offer, among other benefits, techniques for capturing digital image frames with interlaced exposure. The various embodiments disclosed herein provide a user with an intuitive user interface with options to customize image capture with interlaced exposure, thereby providing a user with better control over capture of image frames. The user interfaces explained herein provide an easy way for the user to adjust individual settings for different exposures manually. The user can set capture parameter values for a camera setting to a same value or different values for different exposures. Moreover, the user can view the different exposure settings at the same time. In at least some embodiments, the settings chosen by the user for interlaced image capture may be stored in the memory of the apparatus as a preset option and the user may easily retrieve the settings from the memory whenever needed and capture one or more digital image frames with the chosen settings. In one or more embodiments, the visual display of the chosen settings for each interlaced image capture enables the user to make any corrective changes to the settings, if needed, prior to the actuation of capture of the interlaced image capture of digital image frames.

Furthermore, various example embodiments may be implemented in a wide variety of devices, network configurations and applications for example, in camera devices, in mobile devices or as part of software imaging applications used in any electronic devices.

Computer executable instructions may be provided using any computer-readable media that is accessible by a computing based device. Computer-readable media may include, for example, computer storage media such as memory and communications media. Computer storage media, such as memory, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media is shown within the computing-based device it will be appreciated that the storage may be distributed or located remotely and accessed via a network or other communication link, for example by using communication interface.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

Alternatively, or in addition, the functionality described herein (such as the image processing instructions) can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs). For example, some or all of the device functionality or method sequences may be performed by one or more hardware logic components.

It will be understood that the benefits and advantages described above may relate to one embodiment or may relate to several embodiments. The embodiments are not limited to those that solve any or all of the stated problems or those that have any or all of the stated benefits and advantages.

The steps of the methods described herein may be carried out in any suitable order, or simultaneously where appropriate. Additionally, individual blocks may be added or deleted from any of the methods without departing from the spirit and scope of the subject matter described herein. Aspects of any of the examples described above may be combined with aspects of any of the other examples described to form further examples without losing the effect sought.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. An apparatus comprising:
a digital camera;
at least one memory comprising camera settings;
a processor communicably coupled with the digital camera and the at least one memory and configured to control operation of the digital camera together with the camera settings stored in the at least one memory; and
a user interface for at least one of inputting and adjusting the camera settings, wherein the user interface enables a user to at least one of manually inputting and adjusting image capture parameter values comprising:
   a plurality of first capture parameter values for a first set of pixels of an interlaced image capture; and
   a plurality of second capture parameter values for a second set of pixels of the interlaced image capture,
wherein the processor is configured to store at least one first capture parameter value and at least one second capture parameter value in the at least one memory, and to control the digital camera to capture at least one digital image frame using the interlaced image capture by using the at least one first capture parameter value for the first set of pixels and using the at least one second capture parameter value for the second set of pixels,
wherein the camera settings comprise adjustable settings for two or more of the following capture parameters: exposure compensation, shutter speed, white balance, ISO, delay, zoom, aperture, flash, and flash color temperature, the adjustable settings configured to enable at least one of the inputting and the adjusting of capture parameter values corresponding to a selection of at least one capture parameter from the two or more capture parameters.

2. The apparatus of claim 1, wherein the processor is configured to cause the digital camera to capture:
a first partial image frame by using the at least one first capture parameter value for the first set of pixels during the interlaced image capture; and
a second partial image frame by using the at least one second capture parameter value for the second set of pixels during the interlaced image capture.

3. The apparatus of claim 2, wherein the processor is configured to combine the first partial image frame and the second partial image frame to generate a digital image frame.

4. The apparatus of claim 3, wherein the first partial image frame comprises odd pairs of lines of the digital image frame and the second partial image frame comprises even pairs of lines of the digital image frame.

5. The apparatus of claim 3, wherein the first partial image frame comprises odd lines of the digital image frame and the second partial image frame comprises even lines of the digital image frame.

6. The apparatus of claim 1, wherein the processor is configured to cause the digital camera to capture a plurality of digital image frames in a sequence to facilitate generation of a video from the plurality of digital image frames, each digital image frame from among the plurality of digital image frames generated by combining corresponding first and second partial image frames, the first and the second partial image frames captured by exposing the first set of pixels and the second set of pixels using the at least one first capture parameter value and the second capture parameter value, respectively.

7. The apparatus of claim 1, wherein the camera settings comprise adjustable settings for three or more of the following capture parameters:
exposure compensation, shutter speed, white balance, ISO, delay, zoom, aperture, flash and flash color temperature.

8. The apparatus of claim 7, wherein the processor is configured to cause the user interface to present an interactive display to the user, the interactive display displaying the adjustable settings corresponding to the at least one capture parameter to enable the user to provide input related to the at least one first capture parameter value and the at least one second capture parameter value.

9. The apparatus of claim 8, wherein the interactive display is configured to enable the user to individually adjust the first and the second capture parameter values to at least one of same values and different values.

10. The apparatus of claim 9, wherein the first and the second capture parameter values are displayed to the user on the interactive display at a same time.

11. An apparatus comprising:
a digital camera;
at least one memory comprising camera settings, wherein the camera settings comprise adjustable settings for two or more of the following capture parameters: exposure compensation, shutter speed, white balance, ISO, delay, zoom, aperture, flash, and flash color temperature;
a processor communicably coupled with the digital camera and the at least one memory and configured to control operation of the digital camera together with the camera settings stored in the at least one memory; and
a user interface for at least one of inputting and adjusting the camera settings, wherein the user interface enables a user to at least one of manually inputting and adjusting image capture parameter values comprising:
a plurality of first capture parameter values for a first set of pixels of an interlaced image capture; and
a plurality of second capture parameter values for a second set of pixels of the interlaced image capture,
wherein the processor is configured to store at least one first capture parameter value and at least one second capture parameter value in the at least one memory, and to control the digital camera to capture at least one digital image frame using the interlaced image capture by using the at least one first capture parameter value for the first set of pixels and using the at least one second capture parameter value for the second set of pixels.

12. The apparatus of claim 11, wherein each digital image frame from among the at least one digital image frame is generated by combining:
a first partial image frame captured by using the at least one first capture parameter value for the first set of pixels during the interlaced image capture; and
a second partial image frame captured by using the at least one second capture parameter value for the second set of pixels during the interlaced image capture.

13. The apparatus of claim 12, wherein the first partial image frame comprises odd pairs of lines of the digital image frame and the second partial image frame comprises even pairs of lines of the digital image frame.

14. The apparatus of claim 12, wherein the first partial image frame comprises odd lines of the digital image frame and the second partial image frame comprises even lines of the digital image frame.

15. The apparatus of claim 11, wherein the processor is configured to cause the user interface to present an interactive display to the user, the interactive display displaying adjustable settings corresponding to at least one capture parameter to enable the user to provide input related to the at least one first capture parameter value and the at least one second capture parameter value.

16. The apparatus of claim 15, wherein the interactive display is configured to enable the user to individually adjust the first and the second capture parameter values to at least one of same values and different values.

17. The apparatus of claim 16, wherein the first and the second capture parameter values are displayed to the user on the interactive display at a same time.

18. A method, comprising:
providing a user interface for at least one of inputting and adjusting camera settings associated with a digital camera, wherein the user interface enables a user to manually input or adjust image capture parameter values comprising:
a plurality of first capture parameter values for a first set of pixels of an interlaced image capture; and
a plurality of second capture parameter values for a second set of pixels of the interlaced image capture;
receiving, by a processor, at least one first capture parameter value and the at least one second capture parameter value;
storing, by the processor, at least one first capture parameter value and the at least one second capture parameter value; and
causing, by the processor, a capture of at least one digital image frame using interlaced image capture by using the at least one first capture parameter value for the first set of pixels and using the at least one second capture parameter value for the second set of pixel; and
wherein the camera settings comprise adjustable settings for two or more of the following capture parameters: exposure compensation, shutter speed, white balance, ISO, delay, zoom, aperture, flash, and flash color temperature, the adjustable settings configured to enable at least one of the inputting and the adjusting of capture parameter values corresponding to a selection of the at least one first capture parameter and the at least one second capture parameter.

19. The method of claim 18, further comprising:
causing the user interface, by the processor, to present an interactive display to the user, the interactive display displaying adjustable settings corresponding to at least one capture parameter to enable the user to provide input related to the at least one first capture parameter value and the at least one second capture parameter value, wherein the interactive display is configured to enable the user to individually adjust the first and the second capture parameter values to at least one of same values and different values.

20. The method of claim 19, wherein the plurality of first capture parameter values are not the same as the plurality of second capture parameter values.

* * * * *